March 8, 1955 W. STOFF ET AL 2,703,877
METHOD OF SUPERVISING ELECTRICAL AMPLIFIERS
Filed May 21, 1951
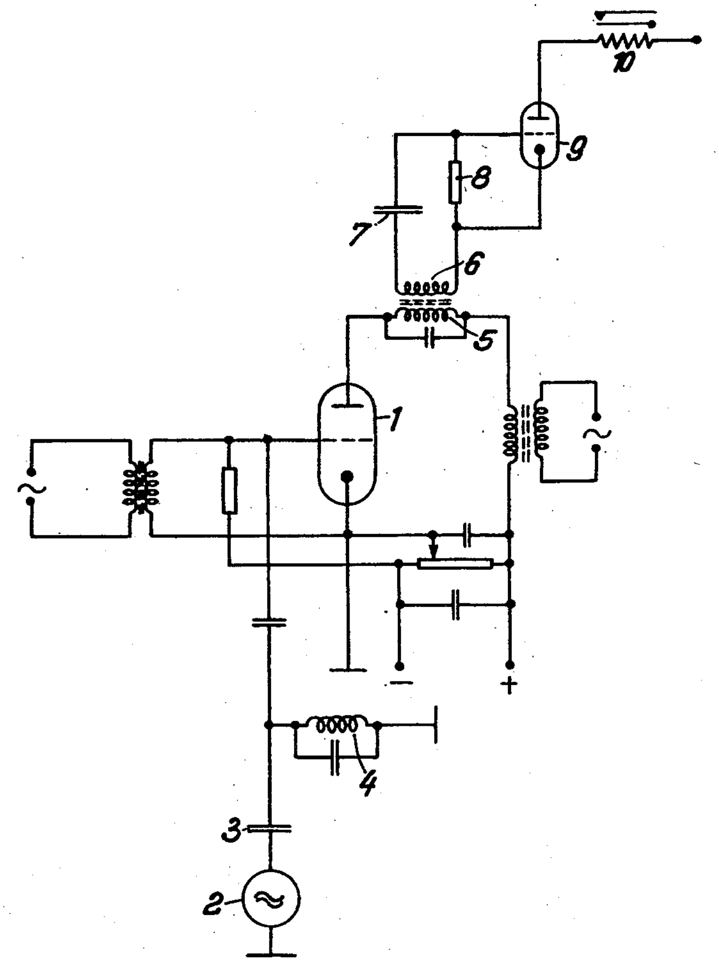
Inventors:
Wolfgang Stoff
Egon Neumann

United States Patent Office 2,703,877

Patented Mar. 8, 1955

2,703,877

METHOD OF SUPERVISING ELECTRICAL AMPLIFIERS

Wolfgang Stoff, Berlin-Steglitz, and Egon Neumann, Berlin-Friedenau, Germany, assignors to Loewe Opta Aktiengesellschaft, Berlin-Steglitz, Germany, a German company Application May 21, 1951, Serial No. 227,289

3 Claims. (Cl. 340—253)

For many purposes it is desirable to supervise the operation of amplifiers in such a way that, at break-down of the amplifier respectively one of its valves, either a visual respectively acoustical signal is given or a new valve is automatically switched-in. Arrangements of this kind are known, for instance, in radio transmitters or at television circuits, sound film circuits, measuring apparatus, and the like; they are mostly based upon the principle of measuring changes of the anode operating current of one of the amplifier valves, e. g. of the output valve. The disadvantage of this arrangement consists in that, at multi-stage amplifiers, it must be provided at each individual stage as, otherwise, at the output stage itself normal interruptions of the current which shall be amplified could not be distinguished from those interruptions which are caused by damage or by valve breakdown.

The present invention removes this shortcoming in connection with low-frequency amplifiers for magnetic sound recording or reproducing devices, and at the same time supplies, at some kinds of such amplifiers, an additional control of further operational values. This invention comprises in combination an electrical low-frequency amplifier for magnetic sound recording or reproducing devices, provided with a generator for pre-magnetizing a sound carrier with a frequency higher than the low-frequencies to be amplified, said generator working continuously during the operation of said amplifier, filters being arranged at the end of the section of the amplifier for taking off the oscillation of said generator, and a signalling device supplied with said oscillation.

The mentioned high frequency or one of its harmonics—preferably the third harmonic—can be employed as signalling frequency for the method of control proposed by this invention. Hereat, the control extends at the same time to the generator of this high frequency source. At the failure of either an amplifier valve of the low frequency amplifier or of a member of the high frequency amplifier, the defect is in each case reliably indicated by the signalling device.

The signalling device itself preferably consists of a control grid valve at the grid of which, by the high frequency control voltage, a high negative cutoff voltage preventing a plate current is generated by means of a periodical charging process of the conventional kind. If the high frequency auxiliary oscillation ceases, a normal plate current immediately occurs which, by means of suitable relays respectively switches, switches on the signal or the automatic process for removing the defect.

Instead of releasing a signal, one can provide, eventually, the quantitative indication of the plate current by designing the indicating valve in this case as a vacuum tube electrometer from which changes of the power amplification ratio of the supervised amplifier can be ascertained, e. g. by reading off an anode current ammeter.

The drawing shows an example of one connection corresponding to this invention, omitting all those members of the whole circuit which are not absolutely necessary for understanding the invention. There is shown an arrangement for producing magnetic sound records at which, by known methods, an oscillation of higher frequency is superimposed to the sound frequency oscillations to be recorded. For this purpose a pre-magnetizing coil connected with a high-frequency generator 2 is provided in connection with a recording head. For amplifying the real sound currents the amplifier 1 is provided of which for clarity's sake, only one stage is shown in the drawing. In practical operation this amplifier has several stages. To the input of amplifier 1 is supplied, besides the useful oscillation with sound frequency, another oscillation with higher frequency which is generated by a generator 2. In the usual magnetic sound recorders, the frequency of this generator 2 is about 30 kilocycles per second. The auxiliary frequency employed for the supervising method described in this invention is derived from the frequency mentioned before preferably as the third harmonic, e. g. by switching-in a selective circuit 4 connected with generator 2 by condenser 3. The auxiliary oscillation for supervising has, consequently, about 90 kc. s. and can be used, simultaneously, as quenching voltage. After it has been supplied to the input circuit of the amplifier, this oscillation is rejected in its output circuit e. g. by means of a transformer 5 tuned-in to it and of an oscillating circuit 6, 7, preferably likewise tuned-in, and finally supplied to an amplifier which expediently is free from grid bias, the grid circuit of this valve 9 being short-circuited by a resistance 8. In the anode circuit of valve 9 a relay 10 is provided which only operates if a plate current is flowing. As long as the oscillation with higher frequency is actuating on the input circuit of valve 9, the latter blocks itself and the relay in its anode circuit remains unexcited. Only if the high frequency oscillation ceases owing to a failure either of amplifier 1 or generator 2, the cutoff of valve 9 is removed and relay 10 is excited, thereby releasing the corresponding signalling or regulating mechanisms.

We claim:

1. In combination an electrical low-frequency amplifier for magnetic sound recording or reproducing devices, provided with a generator for pre-magnetizing a sound carrier with a frequency higher than the low-frequencies to be amplified, said generator working continuously during the operation of said amplifier, filters being arranged at the end of the section of the amplifier for taking off the oscillation of said generator and a signalling device supplied with said oscillation.

2. In combination an electrical low-frequency amplifier for magnetic sound recording or reproducing devices, provided with a generator for pre-magnetizing a sound carrier with a frequency higher than the low-frequencies to be amplified, said generator working continuously during the operation of said amplifier, filters being arranged at the end of the section of the amplifier for taking off the oscillation of said generator and a signalling device supplied with said oscillation, means being provided for generating a harmonic of said oscillation, said harmonic serving as signalling oscillation.

3. In combination an electrical low-frequency amplifier for magnetic sound recording or reproducing devices, provided with a generator for pre-magnetizing a sound carrier with a frequency higher than the low-frequencies to be amplified, said generator working continuously during the operation of said amplifier, filters being arranged at the end of the section of the amplifier for taking off said pre-magnetizing oscillation of said generator and a signalling device supplied with said oscillation, means being provided for generating the third harmonic of said oscillation, said harmonic serving as signalling oscillation.

References Cited in the file of this patent

UNITED STATES PATENTS

| | | |
|---|---|---|
| 2,056,306 | Trucksess | Oct. 6, 1936 |
| 2,460,789 | Thompson | Feb. 1, 1949 |
| 2,550,782 | Cooper et al. | May 1, 1951 |